(12) United States Patent
Li

(10) Patent No.: US 9,377,084 B2
(45) Date of Patent: Jun. 28, 2016

(54) AUTOMATED MANUAL TRANSMISSION WITH DYNAMIC TORQUE TRANSFER DEVICE

(71) Applicant: GM GLOBAL TECHNOLOGY OPERATIONS LLC, Detroit, MI (US)

(72) Inventor: Dongxu Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 61 days.

(21) Appl. No.: 14/448,283

(22) Filed: Jul. 31, 2014

(65) Prior Publication Data

US 2016/0033011 A1   Feb. 4, 2016

(51) Int. Cl.
  *F16H 3/44* (2006.01)
  *B60K 17/08* (2006.01)
  *F16H 37/04* (2006.01)
  *F16H 37/06* (2006.01)

(52) U.S. Cl.
  CPC *F16H 3/44* (2013.01); *B60K 17/08* (2013.01); *F16H 37/042* (2013.01); *F16H 37/046* (2013.01); *F16H 37/06* (2013.01); *F16H 2003/442* (2013.01); *F16H 2003/445* (2013.01); *F16H 2003/447* (2013.01); *F16H 2037/048* (2013.01)

(58) Field of Classification Search
  CPC ............ F16H 2003/447; F16H 2003/442; F16H 2003/445; F16H 37/042; F16H 37/046; F16H 2037/048; F16H 37/06; B60K 17/08
  USPC .......................................... 475/207, 219, 302
  See application file for complete search history.

(56) References Cited

U.S. PATENT DOCUMENTS

| | | | | |
|---|---|---|---|---|
| 3,340,749 A | * | 9/1967 | Schreiner | F16H 37/0846 475/211 |
| 4,553,450 A | * | 11/1985 | Gizard | F16H 37/0846 475/212 |
| 4,864,889 A | * | 9/1989 | Sakakibara | F16H 37/0846 475/211 |
| 5,238,460 A | * | 8/1993 | Esaki | F16H 37/086 475/192 |
| 5,690,576 A | * | 11/1997 | Moroto | F16H 37/0846 475/211 |
| 5,820,508 A | * | 10/1998 | Konig | F16H 37/0846 475/208 |
| 5,888,160 A | * | 3/1999 | Miyata | F16H 37/022 475/216 |
| 7,637,836 B2 | * | 12/2009 | Watanabe | B60K 6/365 475/209 |
| 8,235,857 B2 | * | 8/2012 | Van Druten | F16H 3/006 475/198 |
| 2013/0184119 A1 | * | 7/2013 | Van Druten | F16H 3/44 475/302 |
| 2015/0167802 A1 | * | 6/2015 | Yoshida | F16H 37/022 475/211 |

FOREIGN PATENT DOCUMENTS

FR    WO 2011088849 A1 *  7/2011  ............. F16H 3/006

* cited by examiner

*Primary Examiner* — Roger Pang
(74) *Attorney, Agent, or Firm* — Quinn Law Group, PLLC

(57) ABSTRACT

A transmission system includes an input that is operable to receive torque, and a multi-speed gear train including a final output for transferring torque to a final drive. A clutch interconnects the input and the multi-speed gear train. When disposed in an engaged position, the clutch connects the input and the final output in torque communication therebetween. When disposed in a disengaged position, the clutch disconnects torque communication between the input and the final output. A dual planetary torque transfer device, which includes a pair of planetary gear trains coupled together, and interconnects the input and the final output. The dual planetary torque transfer device is disposed in a parallel relationship with the clutch, between the input and the final output. The dual planetary torque transfer device transfers torque between the input and the final output when the clutch is disposed in the disengaged position.

14 Claims, 2 Drawing Sheets

AUTOMATED MANUAL TRANSMISSION WITH DYNAMIC TORQUE TRANSFER DEVICE

TECHNICAL FIELD

The disclosure generally relates to a powertrain for a vehicle, and more specifically to an automated manual transmission system.

BACKGROUND

Automated manual transmissions use a controller to electronically and automatically engage and disengage a clutch of a manual transmission. The controller also coordinates the shifting between different gear ratios with the engagement and disengagement of the clutch. Accordingly, automated manual transmissions operate in the same manner as traditional manual transmissions, but without the user required inputs of actuating the clutch or changing gear ratios, which are controlled by the controller.

Similar to traditional manual transmissions, automated manual transmissions encounter a torque disruption when the clutch is disengaged to change gear ratios of the transmission. Because users generally expect the shift quality of the automated manual transmissions to approximate the shift quality of an automatic transmission, these torque disruptions are generally undesirable.

SUMMARY

A transmission system for a vehicle is provided. The transmission system includes an input that is operable to receive torque from a power source, and a final output that is operable to transmit torque to a final drive. A clutch interconnects the input and the final output. The clutch is moveable between an engaged position and a disengaged position. When disposed in the engaged position, the clutch connects the input and the final output in torque communication therebetween. When disposed in the disengaged position, the clutch disconnects torque communication between the input and the final output. A dual planetary torque transfer device interconnects the input and the final output. The dual planetary torque transfer device is disposed in a parallel relationship with the clutch, between the input and the final output. The dual planetary torque transfer device transfers torque between the input and the final output when the clutch is disposed in the disengaged position.

A powertrain for a vehicle is also provided. The powertrain includes a power source that is operable to generate a torque. An input is coupled to the power source, and is operable to receive torque from the power source. An automated manual gear train is coupled to the input, and includes a final output that is operable to transmit torque to a final drive. A clutch interconnects the input and the automated manual gear train. The clutch is moveable between an engaged position and a disengaged position. When disposed in the engaged position, the clutch connects the input and the automated manual gear train in torque communication therebetween. When disposed in the disengaged position, the clutch disconnects torque communication between the input and the automated manual gear train. A dual planetary torque transfer device interconnects the input and the final output of the automated manual gear train. The dual planetary torque transfer device is disposed in a parallel relationship with the clutch, between the input and the final output. The dual planetary torque transfer device transfers torque between the input and the final output when the clutch is disposed in the disengaged position, thereby disengaging the automated manual gear train from the input.

Accordingly, when the clutch is disengaged, thereby preventing torque communication through the multi-speed gear train, e.g., the automated manual gear train, the dual planetary torque transfer device transfers torque from the input to the final output to prevent or limit torque disruptions in the powertrain. By transferring torque to the final output when the clutch is disengaged, power may still be transferred to the final drive while the clutch is disengaged to change gear ratios of the multi-speed gear train. By minimizing torque disruptions in the powertrain while gear ratios are being changed in the multi-speed gear train, the shift quality of the powertrain is improved.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
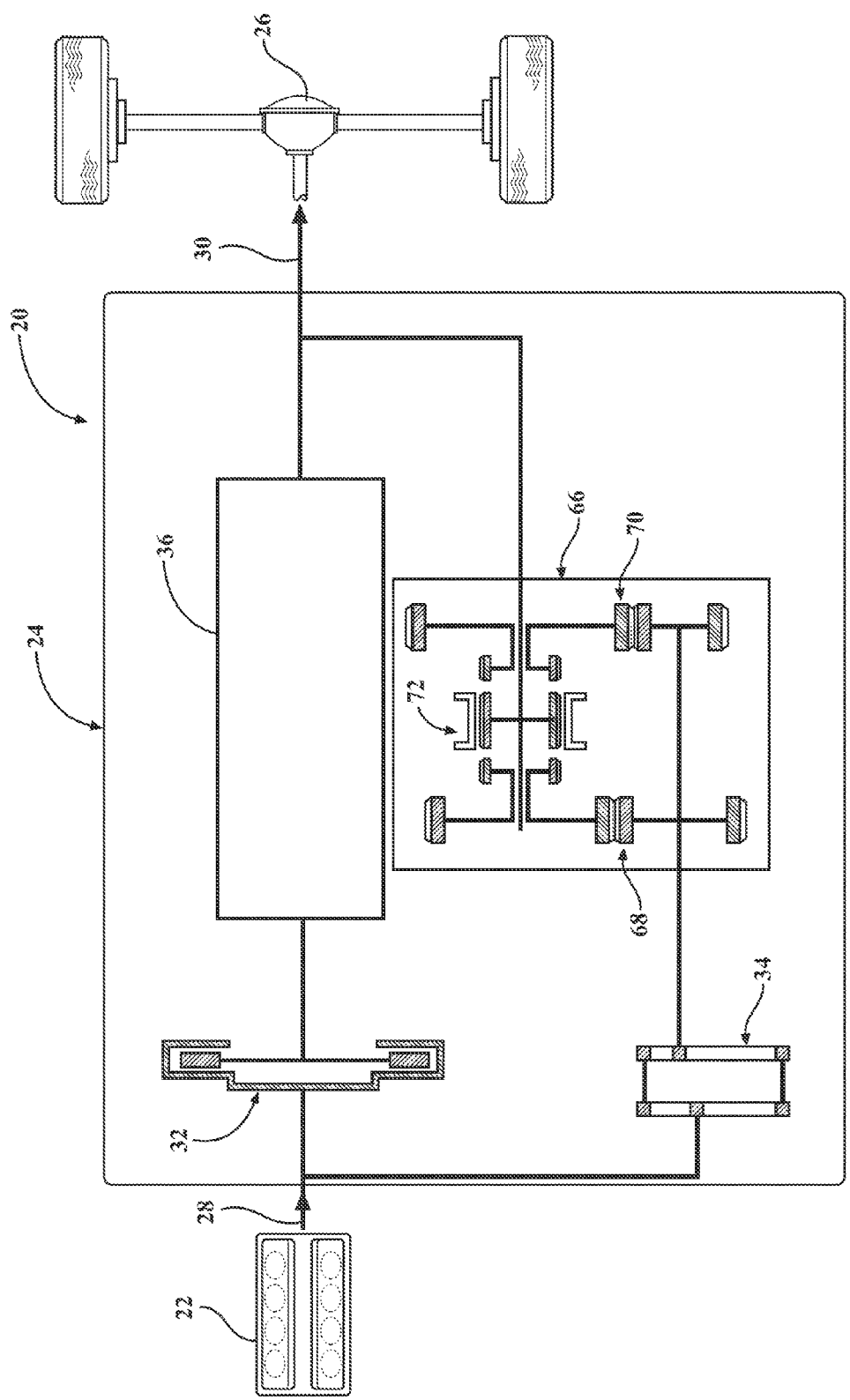
FIG. 1 is a schematic plan view of a powertrain of a vehicle.

Referring to the Figures, wherein like numerals indicate like parts throughout the several views, a powertrain is generally shown at 20 in FIG. 1. Referring to FIG. 1, the powertrain 20 is for a vehicle, and includes a power source 22, and a transmission system 24. The power source 22 may include, but is not limited to, an internal combustion engine, such as a gasoline or diesel engine. Additionally, the power source 22 may include an electric motor, or a combination of an internal combustion engine and an electric motor. The power source 22 generates a torque, which is applied to the transmission system 24. The transmission system 24 transfers the torque from the power source 22 to a final drive 26 or differential of the vehicle.

The transmission system 24 includes an input 28, which is operable to receive the torque from the power source 22, and a final output 30, which is operable to transmit the torque to the final drive 26. A clutch 32 and a dual planetary torque transfer device 34 are each connected to the input 28, and are arranged in a parallel relationship relative to each other. A multi-speed gear train 36 interconnects the clutch 32 and the final output 30. Preferably, the final output 30 is an output of the multi-speed gear train 36. The dual planetary torque transfer device 34 is also coupled to the final output 30, such that the dual planetary torque transfer device 34 may be coupled to the output of the multi-speed gear train 36.

Figure 2:
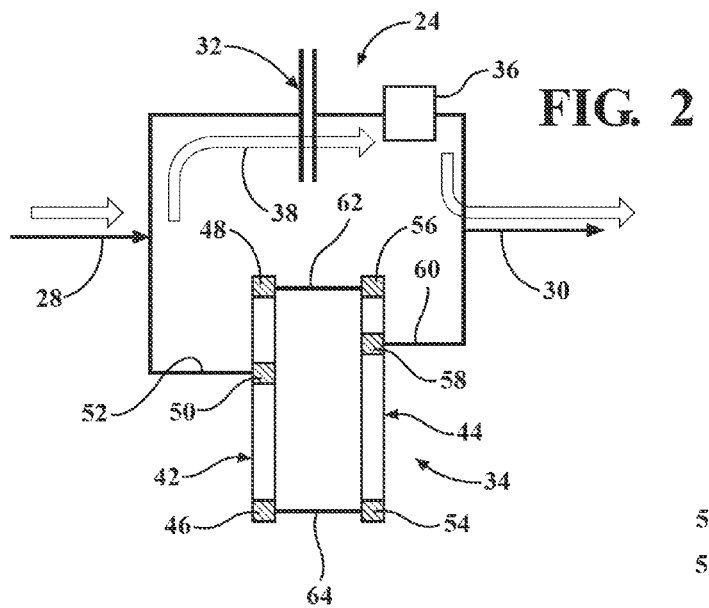
FIG. 2 is a schematic plan view of a transmission system of the powertrain, showing a clutch of the transmission system engaged with a power flow path through the clutch.
Figure 4:
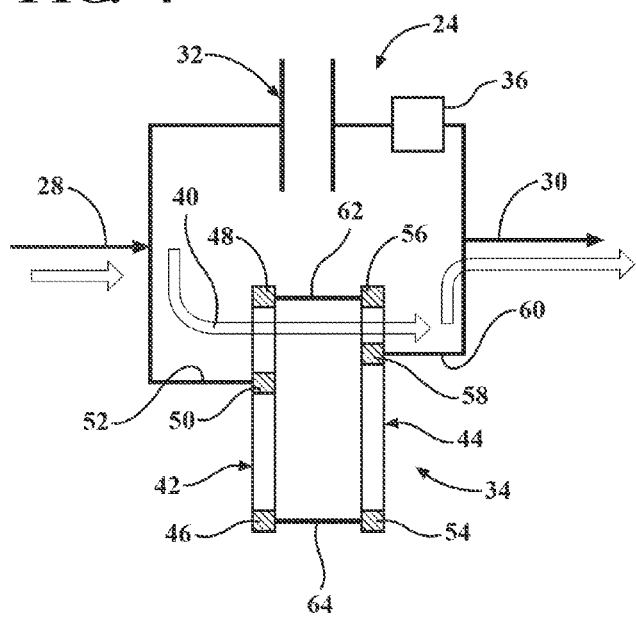
FIG. 4 is a schematic plan view of the transmission system, showing the clutch disengaged with a power flow path through a dual planetary torque transfer device.

As shown in FIG. 1, the clutch 32 interconnects the input 28 and the final output 30 via the multi-speed gear train 36. The clutch 32 is moveable between an engaged position, shown in FIG. 2, and a disengaged position, shown in FIG. 4. Referring to FIG. 2, when disposed in the engaged position, the clutch 32 connects the input 28 and the multi-speed gear train 36 in torque communication therebetween to transfer torque between the input 28 and the final output 30, as is generally shown by the power flow path 38. Referring to FIG. 4, when disposed in the disengaged position, the clutch 32 disconnects or disengages torque communication between the input 28 and the multi-speed gear train 36, to disallow torque communication from the input 28 to the final output 30 via the multi-speed gear train 36. The clutch 32 may include any suitable device capable of selectively connecting and disconnecting torque communication between the input 28 and the multi-speed gear train 36, and specifically between the input 28 and the final output 30 via the multi-speed gear train 36. For example, the clutch 32 may include a dry clutch 32, a wet clutch 32, or some other similar device.

The multi-speed gear train 36 increases the overall operating range of the powertrain 20 by permitting the power source 22, e.g., the engine, to operate through its torque range a number of times. The number of forward speed ratios that are available in the transmission system 24 determines the number of times the engine torque range is repeated. Preferably, the multi-speed gear train 36 is an automated manual gear train, in which a controller actively controls the operation of the clutch 32 and the multi-speed gear train 36 to shift between the different gear ratios of the multi-speed gear train 36. However, it should be appreciated that the multi-speed gear train 36 is not limited to the automated manual gear train described in the preferred embodiment, and may alternatively include a standard manual gear train, an automatic gear train, or some style of gear train not specifically mentioned herein.

Referring to FIG. 1, the dual planetary torque transfer device 34 interconnects the input 28 and the final output 30. Preferably, and as noted above, the dual planetary torque transfer device 34 interconnects the input 28 and the output of the multi-speed gear train 36. The dual planetary torque transfer device 34 is disposed in a parallel relationship with the clutch 32, between the input 28 and the final output 30. Referring to FIG. 4, the dual planetary torque transfer device 34 is operable to transfer torque from the power source 22, between the input 28 and the final output 30, as shown by the power flow path 40, when the clutch 32 is disposed in the disengaged position. Accordingly, when the clutch 32 is disposed in the disengaged position, such that torque transfer from the input 28 to the final output 30 via the multi-speed gear train 36 is disconnected, the torque from the power source 22 may still pass from the input 28 to the final drive 26 through the dual planetary torque transfer device 34. This allows a controller to disengage the clutch 32 and change the gear ratio of the multi-speed gear train 36, while still maintaining torque transfer between the input 28 and the final output 30, thereby preventing undesirable torque disruptions in the powertrain 20 while changing gear ratios of the multi-speed gear train 36.

Referring to FIGS. 2 and 4, the dual planetary torque transfer device 34 includes a first planetary gear train 42 and a second planetary gear train 44. The first planetary gear train 42 may include either a simple planetary gear train or a compound planetary gear train. Similarly, the second planetary gear train 44 may include either a simple planetary gear train or a compound planetary gear train. As used herein, the term "simple planetary gear train" should be understood to include a planetary gear train comprising the three basic components of a planetary gear system, i.e., a sun gear, a planet carrier supporting a plurality of planet gears, and a ring gear (annulus). As used herein, the term "compound gear train" should be understood to include a planetary gear train comprising more than the three basic components of the simple planetary gear train. The first planetary gear train 42 and the second planetary gear train 44 are coupled together to transmit torque between the input 28 and the final output 30. The first planetary gear train 42 includes a first sun gear 46, a first ring gear 48, and at least one first planet gear 50 supported by a first carrier 52. Similarly, the second planetary gear train 44 includes a second sun gear 54, a second ring gear 56, and at least on second planet gear 58 supported by a second carrier 60.

Preferably and as schematically shown in the Figures, the first ring gear 48 and the second ring gear 56 are connected, as indicated by node connection line 62, for rotation together, and the first sun gear 46 and the second sun gear 54 are connected, as indicated by node connection line 64, for rotation together. The first carrier 52 and the second carrier 60 are not connected, and are therefore free to rotate at different speeds relative to each other. The first carrier 52 is connected to the input 28, and the second carrier 60 is connected to the final output 30. It should be appreciated that the first planetary gear train 42 and the second planetary gear train 44 may be configured differently than shown in the Figures and described herein, and may further include more complex planetary gear systems, such as but not limited to compound planetary gear trains.

The first ring gear 48 and the first sun gear 46 cooperate to define a first ring/sun gear ratio of the first planetary gear train 42. Similarly, the second ring gear 56 and the second sun gear 54 cooperate to define a second ring/sun gear ratio of the second planetary gear train 44. The first ring/sun gear ratio is different than the second ring/sun gear ratio. The output torque ratio of the dual planetary torque transfer device 34 is dependent upon the first ring/sun gear ratio, the second ring/sun gear ratio, and the different rotational inertias of the components of the dual planetary torque transfer device 34. However, the first ring/sun gear ratio and the second ring/sun gear ratio must be different so that input and output speeds can be different to accommodate the speeds defined by other components while torque is transferred through the dual planetary torque transfer device 34. When the first ring/sun gear ratio and the second ring/sun gear ratio are equal, all the nodes will rotate at the same speed and the ratio of input torque to output torque is equal to one.

Figure 3:
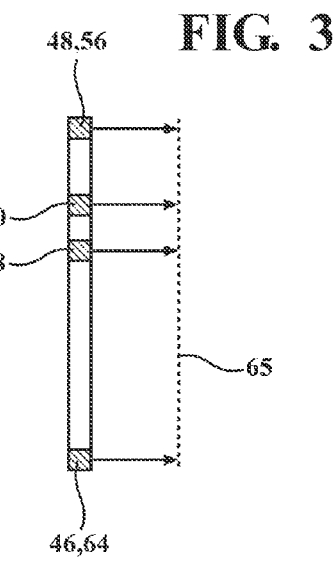
FIG. 3 is a schematic lever diagram showing torque and angular velocity of a dual planetary torque transfer device of the transmission system when the clutch is engaged with power flow through the clutch, such as shown in FIG. 2.

Referring to FIG. 3, when the clutch 32 is disposed in the engaged position, such as shown in FIG. 2, all of the torque from the power source 22 is directed through the clutch 32 and to the final output 30 via the multi-speed gear train 36, and none of the torque from the power source 22 is directed to the first carrier 52 of the dual planetary torque transfer device 34. As shown by the lever diagram of FIG. 3 representing the dual planetary torque transfer device 34 when the clutch 32 is engaged, the rotational speeds, generally shown by the vectors originated from each node ending on line 65, of the connected first ring gear 48 and second ring gear 56, the connected first sun gear 46 and second sun gear 54, the first carrier 52, and the second carrier 60 are the same as indicated by line 65, and the torque transfer through the dual planetary torque transfer device 34 is equal to zero.

Figure 5:
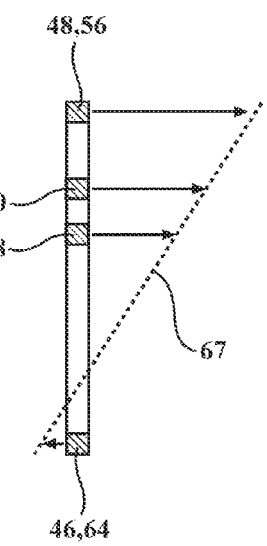
FIG. 5 is a schematic lever diagram showing torque and angular velocity of the dual planetary torque transfer device when the clutch is disengaged with the power flow through the dual planetary torque transfer device, such as shown in FIG. 4.

Referring to FIG. 5, when the clutch 32 is disposed in the disengaged position, such as shown in FIG. 4, all of the torque from the power source 22 is directed through the dual planetary torque transfer device 34, to the final output 30, and none of the torque from the power source 22 is directed to the clutch 32. As shown by the lever diagram of FIG. 5 representing the dual planetary torque transfer device 34 when the clutch 32 is disengaged, the rotational speed and the torque, generally shown by vectors originated from each node ending on line 67, of the connected first ring gear 48 and second ring gear 56, the connected first sun gear 46 and second sun gear 54, the first carrier 52, and the second carrier 60 satisfy the constraint resulting from the two coupled planetary gear sets represented by line 67.

Referring to FIG. 1, the transmission system 24 may further include a speed control mechanism 66, which interconnects the dual planetary torque transfer device 34 and the final output 30. The speed control mechanism 66 is used to control a rotational speed of the components of the dual planetary torque transfer device 34 relative to the rotational speed of the final output 30. The speed control mechanism 66 allows the components of the dual planetary torque transfer device 34 to rotate at slower rotational speed by manipulating the rotational speed output from the dual planetary torque transfer device 34 to more closely match the rotational speed of the input of the dual planetary torque transfer device 34.

The speed control mechanism 66 may include, for example and as shown, a gear train having a first gear combination 68 and a second gear combination 70. Alternatively, the speed control mechanism 66 may include, but is not limited to, a planetary gear train, a continuously variable transmission, or some other similar device.

As shown in the Exemplary embodiment of FIG. 1, the speed control mechanism 66 is moveable between the first gear combination 68 and a second gear combination 70 to control the rotational speed of the dual planetary torque transfer device 34. The first gear combination 68 may be a high gear ratio suitable for use when the multi-speed gear train 36 is operating in higher gear ratios, such as for example a 3rd, 4th, 5th or higher gear ratio. The second gear combination 70 may be a low gear ratio suitable for use when the multi-speed gear train 36 is operating in lower gear ratios, such as for example a 1st, 2nd, or 3rd gear ratio.

The speed control mechanism 66 may include a synchronizer 72 for selectively connecting the dual planetary torque transfer device 34 and the final output 30 through one of the first gear combination 68 or the second gear combination 70, depending upon the rotational speed of the final output 30. The synchronizer 72 operates as is known in the art to rotatably couple one of the first gear combination 68 or the second gear combination 70 to a shaft for rotation therewith. The synchronizer 72 may include any suitable device capable of selectively coupling the first gear combination 68 and/or the second gear combination 70 to a shaft, which is connected to the final output 30 of the transmission system 24.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A transmission system for a vehicle, the transmission system comprising:
   an input operable to receive torque from a power source;
   a final output operable to transmit torque to a final drive;
   a clutch interconnecting the input and the final output, wherein the clutch is moveable between an engaged position connecting the input and the final output in torque communication therebetween, and a disengaged position disconnecting torque communication between the input and the final output;
   a dual planetary torque transfer device interconnecting the input and the final output, and disposed in a parallel relationship with the clutch between the input and the final output, wherein the dual planetary torque transfer device transfers torque between the input and the final output when the clutch is disposed in the disengaged positions;
   a speed control mechanism interconnecting the dual planetary torque transfer device and the final output;
   wherein the speed control mechanism includes one of a gear train, a planetary gear train, or a continuously variable transmission;
   wherein the speed control mechanism includes a gear train having a first gear combination and a second gear combination; and
   wherein the speed control mechanism is moveable between the first gear combination and the second gear combination to control a rotational speed of the dual planetary torque transfer device relative to a rotational speed of the final output.

2. A transmission system as set forth in claim 1 wherein the dual planetary torque transfer device includes a first planetary gear train and a second planetary gear train coupled together to transmit torque between the input and the final output.

3. A transmission system as set forth in claim 2 wherein the first planetary gear train includes one of a simple planetary gear train or a compound planetary gear train, and the second planetary gear train includes one of a simple planetary gear train or a compound planetary gear train.

4. A transmission system as set forth in claim 3 wherein the first planetary gear train includes a first sun gear, a first ring gear, and at least one first planet gear supported by a first carrier, and wherein the second planetary gear train includes a second sun gear, a second ring gear, and at least one second planet gear supported by a second carrier.

5. A transmission system as set forth in claim 4 wherein the first ring gear of the first planetary gear train and the second ring gear of the second planetary gear train are connected for rotation together.

6. A transmission system as set forth in claim 5 wherein the first sun gear of the first planetary gear train and the second sun gear of the second planetary gear train are connected for rotation together.

7. A transmission system as set forth in claim 6 wherein the first carrier of the first planetary gear train is connected to the input.

8. A transmission system as set forth in claim 7 wherein the second carrier of the second planetary gear train is connected to the final output.

9. A transmission system as set forth in claim 8 wherein the first ring gear of the first planetary gear train and the first sun gear of the first planetary gear train cooperate to define a first gear ratio of the first planetary gear train, wherein the second ring gear of the second planetary gear train and the second sun gear of the second planetary gear train cooperate to define a second gear ratio of the second planetary gear train, and wherein the first gear ratio is different than the second gear ratio.

10. A transmission system as set forth in claim 1 further comprising a multi-speed gear train interconnecting the clutch and the final output.

11. A transmission system as set forth in claim 10 wherein the multi-speed gear train is an automated manual gear train.

12. A transmission system as set forth in claim 10 wherein the final output is an output of the multi-speed gear train, such that the dual planetary torque transfer device is coupled to the output of the multi-speed gear train.

13. A powertrain for a vehicle, the powertrain comprising:
a power source operable to generate a torque;
an input coupled to the power source and operable to receive torque from the power source;
an automated manual gear train coupled to the input and including a final output operable to transmit torque to a final drive;
a clutch interconnecting the input and the automated manual gear train, wherein the clutch is moveable between an engaged position connecting the input and the automated manual gear train in torque communication therebetween, and a disengaged position disconnecting torque communication between the input and the automated manual gear train;
a dual planetary torque transfer device interconnecting the input and the final output of the automated manual gear train, and disposed in a parallel relationship with the clutch between the input and the final output, wherein the dual planetary torque transfer device transfers torque between the input and the final output when the clutch is disposed in the disengaged position disengaging the automated manual gear train from the input;
wherein the dual planetary torque transfer device includes a first planetary gear train and a second planetary gear train coupled together to transmit torque between the input and the final output, wherein the first planetary gear train includes one of a simple planetary gear train or a compound planetary gear train, and the second planetary gear train includes one of a simple planetary gear train or a compound planetary gear train;
wherein the first planetary gear train includes a first sun gear, a first ring gear, and at least one first planet gear supported by a first carrier; and
wherein the second planetary gear train includes a second sun gear, a second ring gear, and at least on second planet gear supported by a second carrier.

14. A powertrain as set forth in claim 13 wherein:
the first ring gear and the second ring gear are connected for rotation together;
the first sun gear and the second sun gear are connected for rotation together;
the first carrier is connected to the input;
the second carrier is connected to the final output;
the first ring gear and the first sun gear cooperate to define a first ring/sun gear ratio of the first planetary gear train, the second ring gear and the second sun gear cooperate to define a second ring/sun gear ratio of the second planetary gear train, and the first ring/sun gear ratio is different than the second ring/sun gear ratio; and
a speed control mechanism interconnecting the dual planetary torque transfer device and the final output to control a rotational speed of the dual planetary torque transfer device.

\* \* \* \* \*